United States Patent Office 3,364,046
Patented Jan. 16, 1968

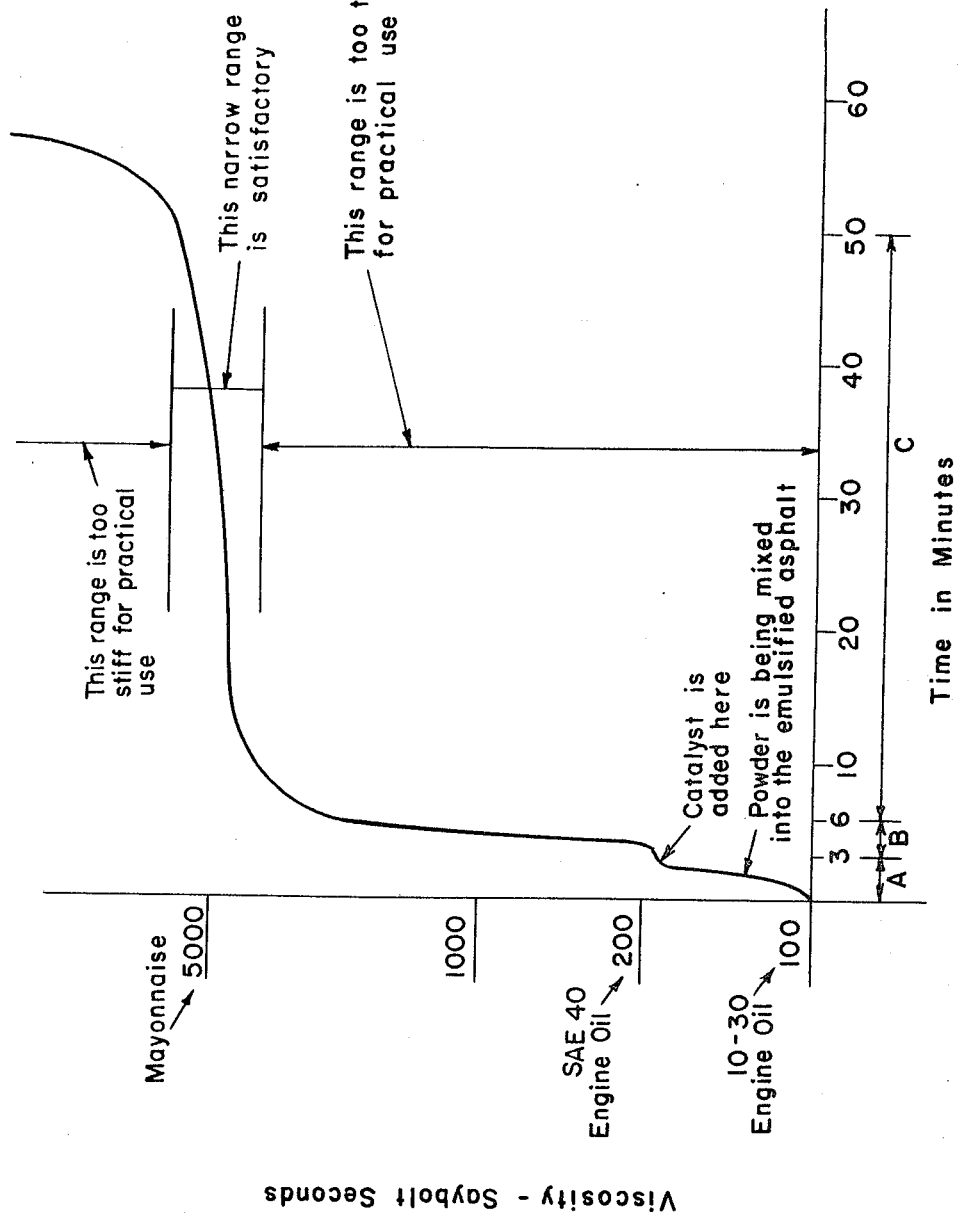

3,364,046
INTERNAL SETTING ADHESIVE AND METHOD
OF MAKING THE SAME
Richard L. Hoover, Princess Anne Way, Summer Hill,
Phoenix, Md. 21131
Filed Sept. 23, 1964, Ser. No. 398,792
8 Claims. (Cl. 106—277)

ABSTRACT OF THE DISCLOSURE

This application discloses an improved internal setting adhesive or binder and a method of making the same which comprises admixing in the order named (1) a liquid emulsion having a viscosity of about 100 seconds and (2) a hydrating setting powder, continuing the mixing of ingredients 1 and 2 until a viscosity of about 200 seconds is obtained for the mixture, then changing the pH of the mixture by addition of (3) a buffer catalyst, accompanied by stirring until the mixture attains a viscosity of about 5000 seconds, comparable to that of mayonnaise.

---

The invention relates to an improved internal setting adhesive or binder and to the method of making the same, wherein the set is obtained by reactions of the components of the system.

The adhesive has three principal reacting components and may be referred to as a three-component binding or adhesive system. These components are (1) a liquid asphalt emulsion, (2) a hydrating or setting powder, and (3) a natural catalyst which serves as a buffer, stabilizer or demulsification control agent.

The first ingredient, namely the liquid asphalt emulsion, is a well known commercial product in which a stable asphalt, particularly an anionic asphalt, constituting the suspended or discontinuous phase of the emulsion or dispersion, is suspended in a continuous phase, namely water. The proportions of the asphalt to water are preferably in the neighborhood of 55 parts of asphalt by weight to 45 of water. However, the proportions may be considerably varied without departing from my invention in its broadest aspects, and may range from approximately 80 parts asphalt to 20 parts water, to 40 parts asphalt to 60 parts water without departing from my invention in its broadest aspects.

The second component, namely the hydrating or setting powder, comprises an hydraulic cement, preferably a cement of high aluminum content such as aluminite or Lumnite. Another setting powder may be Portland cement to which may be added, if desired, a quantity of aluminum powder.

The third ingredient may be termed a catalyst, buffer, stabilizer or demulsification control agent whose function is to control the rate of demulsification of the asphalt emulsion to which the setting agent has been added, thereby insuring relatively long pot life, the setting time being approximately within the range of one-half to one hour. The third component may be either mildly alkaline or mildly acidic, depending on whether the emulsion to which it is added is anionic or cationic. A suitable example of a mild alkaline material is calcium hydroxide or oxide, although other mildly alkaline hydroxides, oxides or salts, either organic or inorganic, may be employed. Also, dilute solutions of strong hydroxides, such for example as a dilute solution of sodium hydroxide, may be employed within the scope of my invention.

Where an acid acting buffer is required any mild inorganic or organic acid acting material (acids or salts) may be employed, as for example dilute hydrochloric acid, acetic acid, or acid acting salts.

In commercial practice I prefer to use an anionic grade of emulsified asphalt because of its ready availability, and where such anionic material is employed I also employ an alkaline catalyst or buffer which will result in an increase in the alkalinity of the final product. On the other hand a cationic grade of emulsified asphalt, where available, may be used within the scope of my invention in its broadest aspects, and in such event I employ an acidic catalyst or buffer to increase the acidity of the final product and to increase the pot life and applicability of such product to the binder or adhesive.

I have found that this increase in the alkalinity or acidity of the product as the case may be, due to the addition of the buffer-catalyst, results in improved pot life and controlled demulsification of the binder-adhesive, this being an important and characteristic feature of my invention.

An important feature of novelty of this invention resides in the manner in which the emulsified asphalt is demulsified and in accordance with my invention such demulsification is based on the manner in which the components are selected and compounded. Emulsified asphalts may be demulsified in various ways, as by evaporation of the suspending phase (water), absorption of the suspending phase, chemical reaction with the suspending phase, or electrolytic plating out of the suspended phase (asphalt).

In accordance with my invention the internal setting adhesive is made by introducing the hydrating powder into the emulsified asphalt accompanied by stirring or mixing until the mixture is homogeneous. The catalyst or buffer substance is then added, causing the novel demulsification. Such demulsification occurs gradually and extends over a considerable period of time. The catalyst causes the hydrating powder to commence reaction with the suspending phase (water) of the emulsified asphalt. It also simultaneously starts a polarity change of the electrolytic charge of the suspending phase of the emulsified asphalt. This change of polarity, together with stirring or mixing, causes the consistency and appearance of the mixture to change from that of engine oil to that of mayonnaise. Normally, when an emulsified asphalt is demulsified by electrolytic plating out of the suspended phase, the plating out occurs between the suspended phase of the emulsified asphalt and another object, such as aggregate or stone. In this instance this is not true, the plating out occurring between the many minute globules of asphalt constituting the suspended phase.

As previously stated, the emulsified asphalt may be of either anionic of cationic type, the hydrating powder may be any one of the various grades of hydrating cements, and the catalyst may be a mild solution of either an alkaline or acidic substance, depending on whether the emulsified asphalt is anionic or cationic.

In practice I prefer to use an anionic grade of emulsified asphalt of South American origin, such as is readily available on the market, and add thereto a hydrating cement which may be of either the calcium silicate or calcium aluminite type. Since all grades of hydrating cements are nearly neutral in pH, but bordering slightly on the alkaline side, and since all anionic emulsions are much more alkaline than the cement, the mixing of the hydrating cement into the emulsion causes the resultant pH to at first become more alkaline than the original cement and less alkaline than the original emulsion. This changing of pH of the emulsion causes the particle charge of the suspending phase of the emulsified asphalt to become weaker in its negative charge. The addition of the catalyst (an alkaline since we are using an anionic emulsion), which has an excess of negative charges, will reinforce the negative charges of the suspending phase of the emulsified asphalt by countering the charges of the cement. The resulting reaction causes the consistency of the mixture to change from approximately that of engine oil (about 200 seconds) to that of mayonnaise (about 5000 seconds). Stirring of the mixture is preferably continued until the reaction is completed.

In order to have a usable internal setting adhesive it is essential that it have both internal setting qualities and a consistency such as that of mayonnaise, which will allow the workman to apply the material.

The invention will be more readily understood by reference to the following specific example and to the accompanying drawing or graph.

Example

Reacting ingredients are as follows:

| | Parts by weight |
|---|---|
| (1) Liquid anionic emulsified asphalt (South American base) having an initial viscosity of about 100 seconds | 70 |
| (2) Hydraulic cement (Lumnite) | 19.5 |
| (3) Catalyst-buffer (calcium hydroxide) 0.10 mol solution | 00.5 |

These three ingredients are preferably supplied in the order named to a suitable mixer and are mixed until the proper consistency is attained. It is essential to my process that the first two ingredients be supplied to the mixer prior to the addition of the third ingredient, namely the catalyst-buffer.

The emulsified asphalt in liquid form may be supplied to the mixer from a suitable container, as for example a five gallon can, and thereafter the setting powder is added and thoroughly mixed with the asphalt. No marked change in consistency or appearance takes place at this time although there is an increase in viscosity of from approximately 100 seconds to 200 seconds. At this stage the mixture has a consistency and appearance similar to that of engine lubricating oil (SAE No. 30–40). The third ingredient, namely the catalyst-buffer, is now added and mixing or stirring continued, whereupon a marked change in appearance and consistency takes place within a relatively short period of time, the whole mass becoming viscous and at the same time more like mayonnaise in appearance, the mass comprising innumerable distinct globules. During this period the viscosity increases from about 200 seconds (that of No. 30–40 weight engine oil), to about 5000 seconds (that of mayonnaise). The entire mass includes large globules which disappear in time as the setting or demulsification progresses.

When the mass has attained the appearance of consistency of mayonnaise it is ready for application to the desired surface, where it serves as an adhesive or binder.

My improved adhesive or binder is particularly adapted to bond board insulation to masonry, wood or metal for use in the construction of cold storage rooms, locker plants and other low temperature rooms.

The mixing and setting operation will be apparent from a consideration of the accompanying drawing or graph wherein time in minutes is plotted against viscosity in Saybolt seconds.

The first three minutes (line A) represents the average time necessary to mix in the setting powder with the liquid asphalt emulsion (ingredient 1). It will be noted that the viscosity of the emulsion (1) before the addition of the setting powder (2) is about 100 seconds and that it increases to about 200 seconds after the addition and mixing in of the setting powder.

The second three minutes (line B) represents the average time necessary to blend in the catalyst (ingredient 3) and for it to react. It will be noted that the viscosity of the mixture changes from about 200 seconds (that of a #40 weight engine oil) to that of mayonnaise, which is about 5000 seconds.

The next thirty minutes to one hour (line C) represents the pot life of the binder or adhesive. At the end of the pot life the adhesive tightens due to the hydrating of the setting powder. This variable is a function of the temperature and percentage of water in the emulsion.

The idea of mixing a setting powder into a liquid asphalt using proportions that preclude the mixture from becoming stiff, but instead keeping it still a liquid, then establishing the desired consistency (that of mayonnaise) by the addition of a catalyst is an important characteristic of my invention. This is important because it allows the powder to become mixed easily and completely since the mixture is always a liquid after which the desired consistency may be established by the addition of a catalyst to insure uniform and complete reaction.

Many attempts have been made to arrive at the desired consistency merely by adding more setting powder. This has always failed because when the extra amount of powder is added to give this desired consistency the adhesive has no pot life; that is to say, the desired consistency is gone within a minute or so. That is why there is no other internal setting adhesive on the market today that uses emulsions as the base of the adhesive.

Lines A, B and C of the graph have to do with the demulsification of the emulsified asphalt. The setting of the adhesive starts where line C leaves off. An important feature of the invention has to do with the demulsification phase, which is quite distinct from the usual operation of setting powders.

The invention has been described in detail for the purpose of illustration, and it will be obvious that numerous modifications and variations may be resorted to without departing from the invention in its broadest aspects as defined in the accompanying claims.

I claim:

1. A method of producing an internal setting emulsified asphalt binder adhesive having a pot life of ½ to 1 hour which consists in admixing (1) a liquid asphalt emulsion having an asphalt content of about 55% by weight and about 45% by weight of water and having a viscosity of about 100 seconds with (2) a hydrating setting powder, selected from a group consisting of calcium silicates and calcium aluminates, continuing the mixing of ingredients (1) and (2) until a viscosity of about 200 seconds is obtained for the mixture, then changing the pH of the mixture by addition of (3) a buffer catalyst in catalytic proportions, accompanied by stirring until the mixture attains a viscosity of about 5000 seconds comparable to that of mayonnaise, the ratio of (1) and (2) being approximately 70 to 19.5 by weight.

2. A method as set forth in claim 1 wherein ingredient (1) is an anionic asphalt emulsion, ingredient (2) is a calcium aluminate, and ingredient (3) is an alkaline reacting buffer.

3. A method as set forth in claim 1 wherein the asphalt emulsion is cationic and the catalyst-buffer is acid reacting.

4. An asphalt binder adhesive composition having a pot life of from one-half hour to one hour produced in accordance with claim 1 and having a viscosity of about 5000 seconds comparable to the consistency of mayonnaise.

5. A process of producing a laminated article which comprises applying the binder adhesive of claim 4 to a surface and allowing the binder to set.

6. The method as set forth in claim 2 wherein ingredient (3) is a metal hydroxide.

7. The method as set forth in claim 3 wherein the catalyst buffer is a member of a group consisting of acids and acid acting salts.

8. The method as set forth in claim 1 wherein ingredients (1), (2) and (3) are used in approximately the following proportions by weight:
(1) 70 parts
(2) 19.5 parts, and
(3) 00.5 part.

References Cited

UNITED STATES PATENTS

| | | | |
|---|---|---|---|
| 1,783,365 | 12/1930 | Lewis | 106—277 |
| 1,959,586 | 5/1934 | Kirschbraun | 106—96 |
| 2,526,538 | 10/1950 | Camp | 106—277 X |
| 2,560,871 | 7/1951 | Johnson et al. | 106—96 X |
| 2,773,777 | 12/1956 | Alexander et al. | 106—277 X |

OTHER REFERENCES

Goggin et al.: Developments in Plastic Foam-In Plastics, April 1947, pages 18 and 20.

Modern Plastics, December 1954, pages 87–91, Plastics vs. Heat and Cold.

ALEXANDER H. BRODMERKEL, *Primary Examiner.*

J. B. EVANS, *Assistant Examiner.*